R. H. McDANIEL.
ELECTRIC LIGHT EXTENSION.
APPLICATION FILED APR. 14, 1917.
1,270,636.
Patented June 25, 1918.
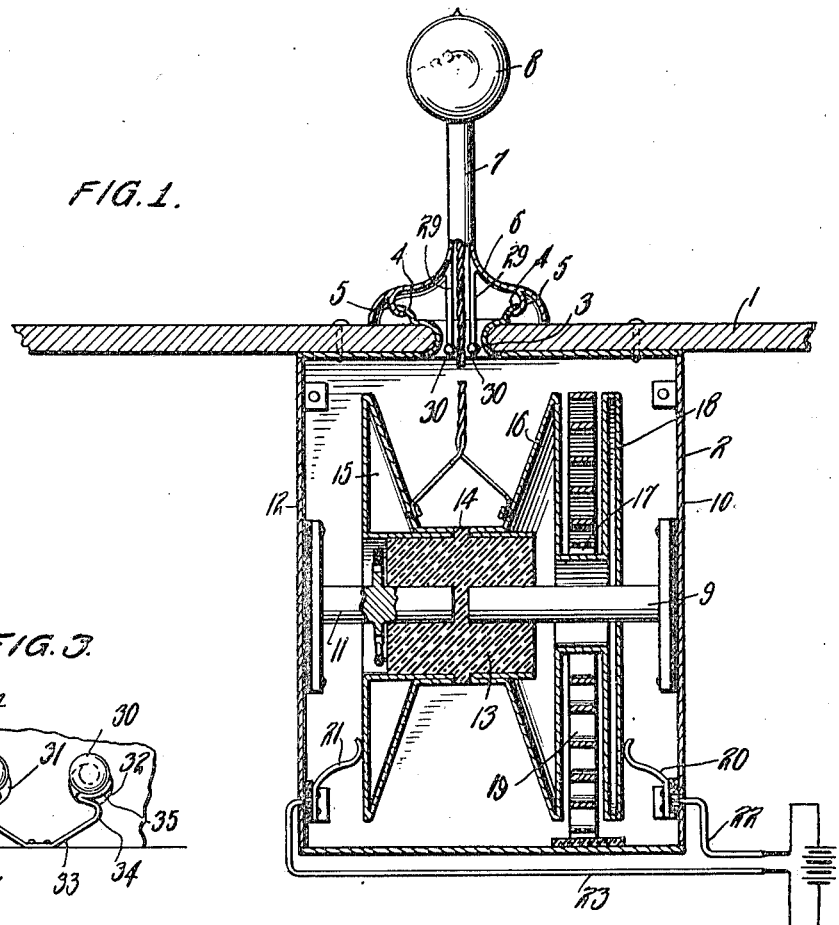
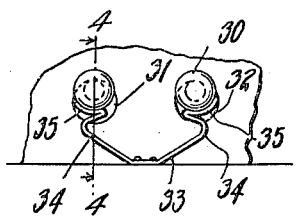
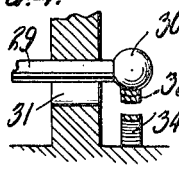
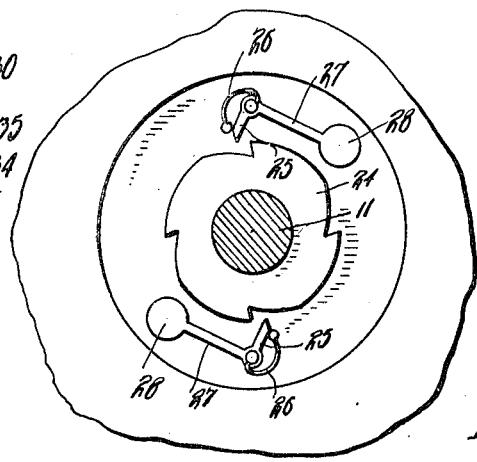
WITNESSES
INVENTOR
Ross H. McDaniel
BY
ATTORNEY

# UNITED STATES PATENT OFFICE.

ROSS H. McDANIEL, OF PERU, INDIANA.

ELECTRIC-LIGHT EXTENSION.

1,270,636.  Specification of Letters Patent.  Patented June 25, 1918.

Application filed April 14, 1917.  Serial No. 162,123.

*To all whom it may concern:*

Be it known that I, ROSS H. McDANIEL, a citizen of the United States, residing at Peru, in the county of Miami and State of Indiana, have invented certain new and useful Improvements in Electric-Light Extensions, of which the following is a specification.

This invention relates to electric lamp extensions and more particularly to an extensible, portable electric light adapted for use particularly on automobiles and motor trucks.

The primary object of the invention is to provide an auxiliary electric light normally carried on the dash-board of the automobile and designed to permit the light to be carried to any part of the vehicle for illuminating the same to permit repairs or other necessary operations to be accomplished.

One of the objects of the invention is to provide a rotatable spool carrying a length of electric wire, and the latter so associated with the spool that current may be transferred through the spool to the wire for illuminating the light regardless of the length of wire unwound from the spool.

Another object of the invention is to provide a light of this character having means for permitting the light to be mounted at any desired point on the front or rear of the vehicle, whereby the operator may be free to use both hands, while working at the vehicle.

Another object of the invention is to provide a rotatable spool mounted upon the dash-board of the automobile and adapted to automatically wind the electric wire when the lamp is returned to normal position, the said spool having automatically operated means for preventing a quick and sudden winding of the wire should the light accidentally be released.

A further object of the invention is the provision of an electric lamp extension which consists of comparatively few parts and is simple in construction, but durable and well adapted to withstand the rough usage to which devices of this character are ordinarily subjected.

For a full description of the invention and the advantages and merits thereof, reference is to be had to the following description and the accompanying drawings, wherein is illustrated the preferred form of my invention, in which;

Figure 1 is a horizontal section through the device mounted upon the dash-board of an automobile, the electric wire being broken away to more clearly disclose its construction.

Fig. 2 is a fragmentary end view of the spool.

Fig. 3 is a detail view of the attaching means for the light.

Referring to the drawing, wherein is illustrated the preferred form of my invention, and in which like numerals of reference indicate corresponding parts throughout the several views, the dash-board 1 carries a casing 2 which is of substantially rectangular formation and constructed in any preferred manner. This casing is preferably arranged on the inner side of the dash-board beneath the hood of the automobile, so that the casing will be out of sight. Suitable fastening screws or the like are employed to fasten the casing to the dash-board. The dash-board 1 has an opening for receiving the sleeve 3 attached to the casing, and the sleeve is of hollow construction to establish communication between the interior of the casing and the open side of the dash-board directly in front of the driver's seat. This sleeve 3 carries diametrically opposite hooks 4, and these hooks are releasably connected to the hooks 5, carried by the base 6 of the lamp standard 7. The terminal of the standard carries the usual electric bulb 8. It is to be observed that the hooks 5 are integrally formed with the interior of the base 6, the latter being hollow, and the standard 7 being hollow.

The interior of the casing is provided with a shaft which consists of two sections, the section 9 being attached to and insulated from the wall 10 of the casing, while the section 11 is attached to and insulated from the wall 12 of the casing at the opposite side thereof. The terminals of the shaft sections 9 and 11 are held in spaced relation since the combined lengths of the sections are less than the width of the casing 2. Mounted upon the shaft is an insulating block 13, the same having recesses for receiving the proximate ends of the shaft sections 9 and 11, the terminals of the recesses preventing contact of the ends of the shaft, and also insulating the sections from each other. The block 13 is constructed from any suitable insulating material, such as hard rubber, porcelain, or the like.

The block 13 is of cylindrical formation and has a central annular flange 14 for the purpose of dividing the metallic sections of the spool of which the block is a part. The flanges of the spool are formed by suitable bent pieces of thin metallic material, one of which is mounted on one end of the block to form the flange 15, while the other is mounted on the other end of the block forming the flange 16. The inner walls of the flanges 15 and 16 are disposed at an angle, and it will be noted that they are entirely insulated from each other, since the annular flange 14 on the block 13 separates the two.

The flange 16 carries a centrally located cylinder 17 which extends around the shaft section 9 but is considerably spaced away therefrom, and this cylinder has the large annular flange 18, thus providing an auxiliary spool formed by the flange 16, cylinder 17 and the flange 18. This auxiliary spool receives the clock-spring 19, the same having one terminal securely fixed and insulated from one wall of the casing 2, while its opposite end is fixed to the sleeve 17 which forms the hub of the spring spool.

Insulated electric light wires, in the form of the ordinary cloth-covered wiring cord are wound upon each spool and the terminals of the cord are fixed one to each flange 15 and 16. The opposite end of the cord is connected with the electric light 8, and it will be understood that any desired length of cord may be wound upon the wiring spool and when the spool is fully wound, the spring 19 will be unwound. When the standard 7 is removed from the hooks on the front of the dash-board, the cord will be pulled from the wiring spool through the opening in the dash-board and the spool will thereby be rotated. When this occurs, the spring 19 will be wound up, gaining a tension that will act to automatically rewind the wire on the wiring spool, when the lamp is released.

A brush 20 is carried by, and insulated from, the wall 10 of the casing, and the end of this brush is in contact with the surface of the flange 18. A brush 21 is carried by, and insulated from, the wall 12 of the casing, this brush being in contact with the flange 15. A conductor 22 is suitably connected with the brush 20, while a second conductor 23 is connected with the brush 21. The terminals of these conductors 22 and 23 may be connected with a battery or any other suitable source of current in the usual manner. It will be noted that through the medium of the metallic construction of the spring spool, and the flange 16, the current will be permitted to pass from the brush 20, and the terminal of the wire on the flange 16 at all times even though the spool is rotating. The same is true of the conductor 23, since the brush 21 will carry current by virtue of the flange 15, to the opposite terminal of the wire attached to the flange 15. Thus, current is conveyed to the light, regardless of whether or not the spool is rotating.

As shown particularly by Fig. 2 of the drawing, the shaft section 11 carries a ratchet wheel 24 in close proximity to the end of the block 13, and the latter supports a pair of ratchet pawls 25 mounted upon pins carried by the end of the block 13. Each pin receives one end of a spring 26 adapted to maintain the pawl in applied position, in engagement with the ratchet 24. In this connection, it is pointed out that the shaft sections are stationary and do not rotate but the block is rotatably mounted on the shaft sections and is free to rotate when released by the pawls 25. Attached to the pawls are the levers 27 having weights 28 formed at their free terminals and these weights act by a centrifugal force to maintain the pawls 25 in applied position on the ratchet 24, when the spring 19 tends to rotate the spool at a fast rate of speed. When the speed becomes too great, the weights will be thrown outwardly and the pawls will thereby be engaged with the ratchet and the spool will come to a stop. The operator, therefore, should maintain a hold on the wire and permit the same to be fed slowly on the spool when the wire is being rewound.

Within the lamp base 6 is a pair of supporting arms 29, and the same are constructed from suitable lengths of stiff wire fixed in any preferred manner to the interior of the base 6 at the point where the latter merges into the standard 7. These rods 29 are maintained in spaced relation, each being disposed at diametrically opposite points to one side of the longitudinal center line of the lamp standard so that the electric cord will be permitted to pass through the standard and between the rods. The free end of each rod has a spherical knob 30 and in Fig. 3, I have illustrated the manner of attaching the lights by means of these knobs. In the fender, or any part of the automobile body, the same is provided with a pair of spaced apart openings, designated in Fig. 3 as 31 and 32, and when it is desired to mount the light in position, for instance, on one of the fenders, the knobs 30 will be thrust through the openings 31 and 32. Fixed to the corresponding part of the automobile is a clamp 33 which includes the two spring arms 34 having the spring fingers 35 formed at their ends. These spring fingers engage the knobs and force the rods into engagement with the edge of the aperture or opening 31 or 32 so that the knob is prevented from being withdrawn through the opening until the spring arms are compressed. This maintains the light in position for permitting the operator to work around the corresponding part of the machine without the necessity of holding the light.

From the foregoing it will be observed that a very simple and durable electric lamp extension has been provided, the details of which embody the preferred form. I desire it to be understood, however, that slight changes in the minor details of construction may be made without departing from the spirit of the invention or the scope of the claims hereunto appended.

I claim:

1. An electric light extension comprising a shaft, means for supporting the shaft, a rotatable spool mounted on the shaft, a portable light, a length of wire connected to the light and to the said spool, a coil spring having one end fixed to the spool to rewind the same after the wire has been unwound from the spool, means for governing the speed of the rotation during rewinding of the spool, the said means including a ratchet, a pair of pawls movable toward or away from the ratchet, and weighted arms carried by the pawls.

2. An electric light extension comprising a rotatable spool having a length of wire connected thereto and wound upon the same, a coil spring having one end fixed to the spool and adapted to be wound when the said wire is unwound from the spool whereby the said spool may be rotated to wind the said wire when the said spring is released, a fixed ratchet, and weighted arms carried by the spool and provided with pawls adapted to engage the said ratchet for governing the speed of rotation during rewinding of the said spool.

In testimony whereof I affix my signature in presence of two witnesses.

ROSS H. McDANIEL.

Witnesses:
 JOSEPH N. TILLETT,
 F. A. TILLETT.